April 30, 1968 T. J. RYS ET AL 3,381,106
SWITCH ENCLOSURE AND SEALING MEANS THEREFOR
Filed Aug. 3, 1967 3 Sheets-Sheet 1
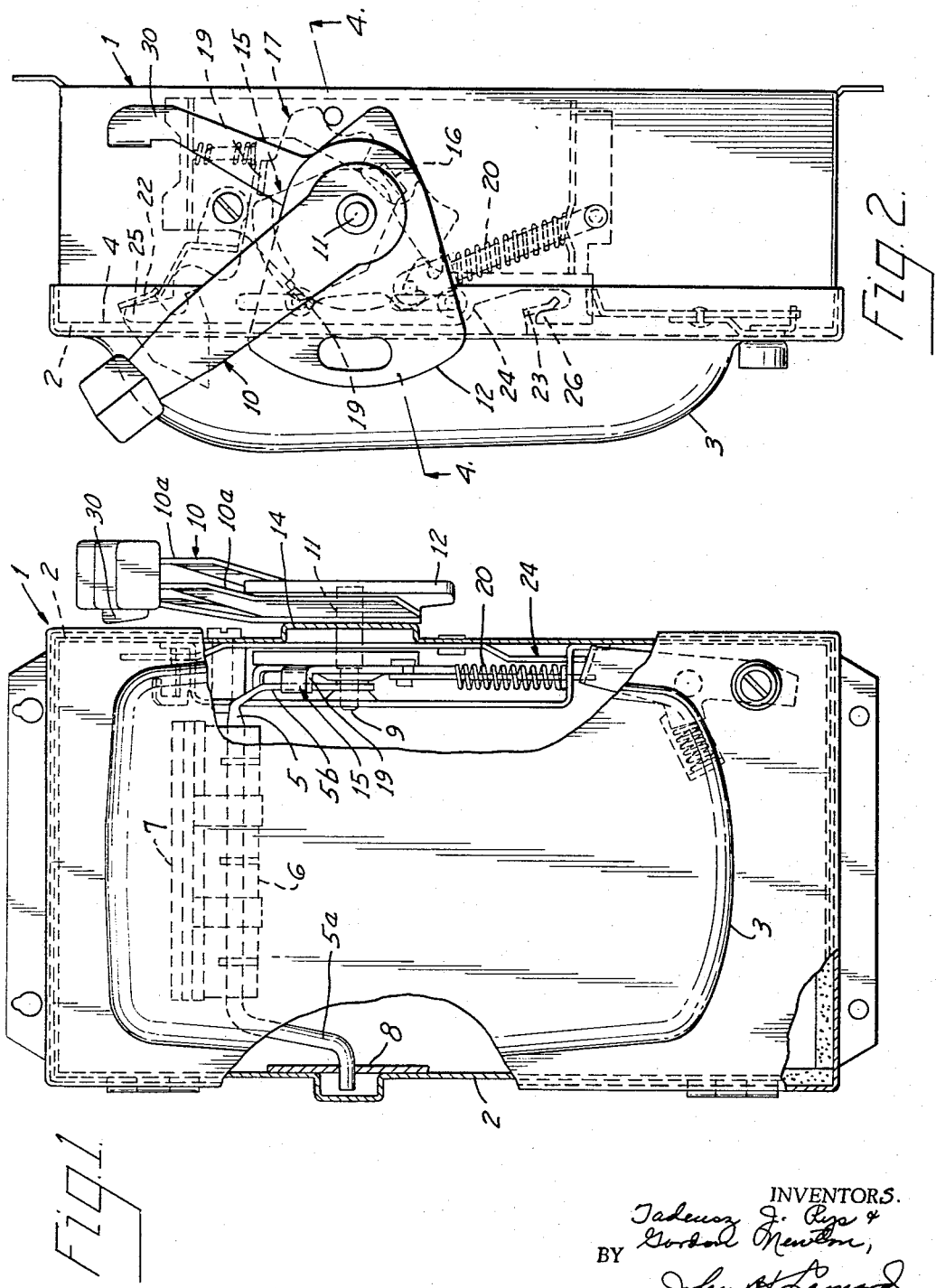

April 30, 1968          T. J. RYS ET AL          3,381,106
SWITCH ENCLOSURE AND SEALING MEANS THEREFOR
Filed Aug. 3, 1967                              3 Sheets-Sheet 2

INVENTORS.
Tadeusz J. Rys &
Gordon F. Newton,
BY John H. Leonard,
their ATTORNEY.

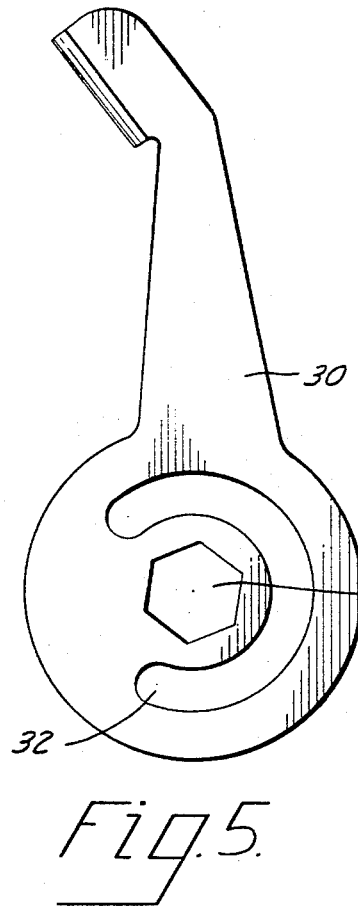
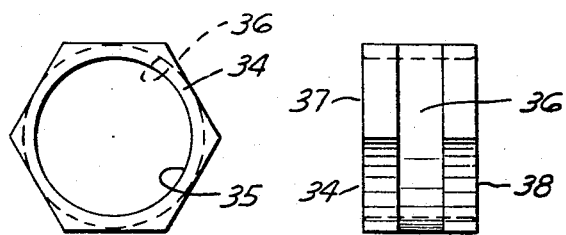
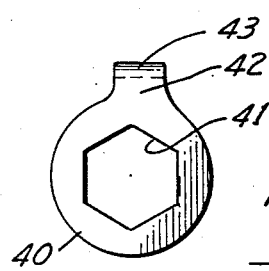
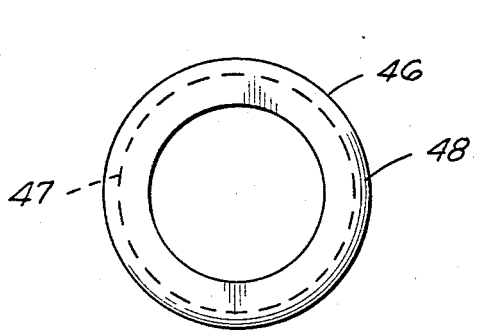
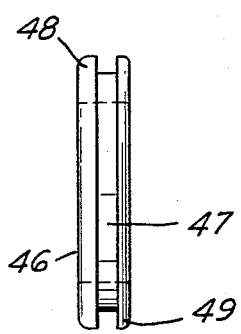

United States Patent Office 3,381,106
Patented Apr. 30, 1968

3,381,106
SWITCH ENCLOSURE AND SEALING
MEANS THEREFOR
Tadeusz J. Rys, and Gordon Newton, Lexington, Ky., assignors to Square D Company, Park Ridge, Ill., a corporation of Michigan
Filed Aug. 3, 1967, Ser. No. 658,176
6 Claims. (Cl. 200—168)

ABSTRACT OF THE DISCLOSURE

The switch enclosure herein comprises a box 1 with a hinged front door 3 carrying a gasket 4 which, when the door is closed, seats on the peripheral front edge 2 of the box. A switch bar driving mechanism is disposed in the box and is operable by an external operating handle 10. Also within the box is a slide bar 24 which, when the door 3 is closed, can be operated by an external sealing lever 30 for drawing the door into sealing position. The handle 10 is rotatable with a supporting rock shaft 11 which extends through an aperture 13 in a side wall of the box. At its inner end the shaft is connected to a driving mechanism for the switch bar 5. The lever 30 is mounted in fixed position on a sleeve 34 which is supported on, and for rocking relative to, the shaft 11. The sleeve 34 is drivingly connected to an operating mechanism including an operator 40 for the slide bar 24.

The principal feature of the invention is the sealing for the aperture 13 to prevent entry of foreign matter, as follows:

The clearance space between the shaft 11 and the interior of the sleeve 34 is sealed by O-ring 39. The clearance space between the exterior of the sleeve 34 and the edge of the peripheral edge of the aperture 13 is sealed by a grommet 46.

---

This invention relates to a switch enclosure of the type disclosed in the copending application of Tadeusz J. Rys, Ser. No. 635,824, filed May 3, 1967, and entitled, Switch Enclosure with Multiple Interlocks, wherein a switch operating mechanism located within a box is operable by a manually operable external operating handle for opening and closing the switch, a door sealing mechanism is disposed within the box and is operable by a manually operable external sealing lever, various interlocks for the mechanisms are provided, and interlock defeaters are arranged with portions exposed at the exterior of the box for access by, and operation by, a tool.

In the prior structure above identified, a cover interlock lever is mounted for rocking on a fixed external pivot and is connected to the door sealing mechanism within the box by a tang disposed on the lever in eccentric relation to the rocking axis of the lever. The tang extends through an arcuate slot in the side wall of the box into the interior of the box and is connected at its inner end to the door sealing mechanism. Such an arrangement is satisfactory for many purposes, but the tang and slot arrangement render sealing for moisture-proofing and water-tightness very difficult.

The present invention is directed to an improved connecting means and arrangement of lever and handle wherein the slot is eliminated, and a simple aperture, coaxial with the common axis of the lever and handle, is used instead, and a novel sealing means is provided for preventing entry of foreign matter through the aperture through which the connecting means from the lever and handle to the mechanisms within the box extend.

Various other objects and advantages of the invention will become apparent from the following description wherein reference is made to the drawings, in which:

FIG. 1 is a front elevation of a switch enclosure embodying the principles of the present invention;

FIG. 2 is a right side elevation, partly in section, of the structure illustrated in FIG. 1;

FIG. 5 is a right side elevation of a cover interlock lever;

FIG. 6 is a right side elevation of a mounting sleeve for the interlock lever;

FIG. 7 is a front elevation of the sleeve of FIG. 6;

FIG. 8 is an elevation of a slider operator for the interlock lever, as viewed axially of the rocking axis of the interlock lever;

FIG. 9 is a right side elevation of a sealing grommet used in the invention; and FIG. 10 is a front elevation of the grommet.

Figure 4:
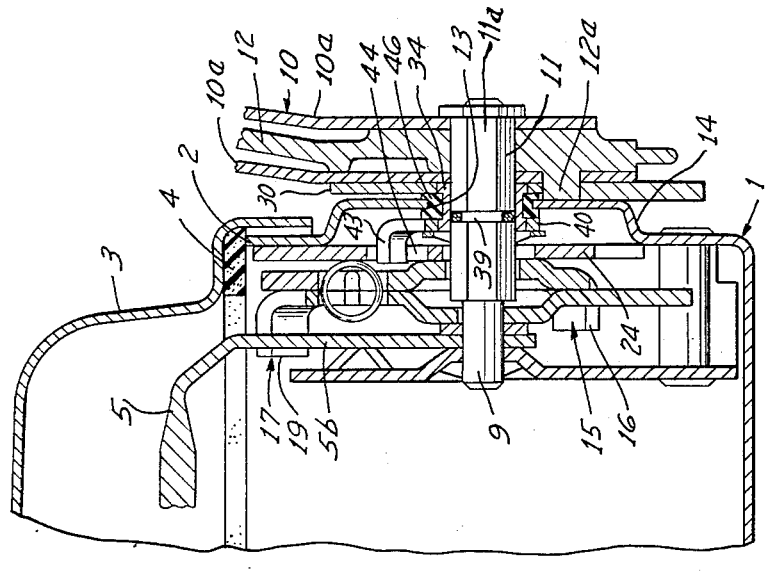
FIG. 4 is a fragmentary, sectional view taken on the line 4—4 in FIG. 2.
Figure 3:
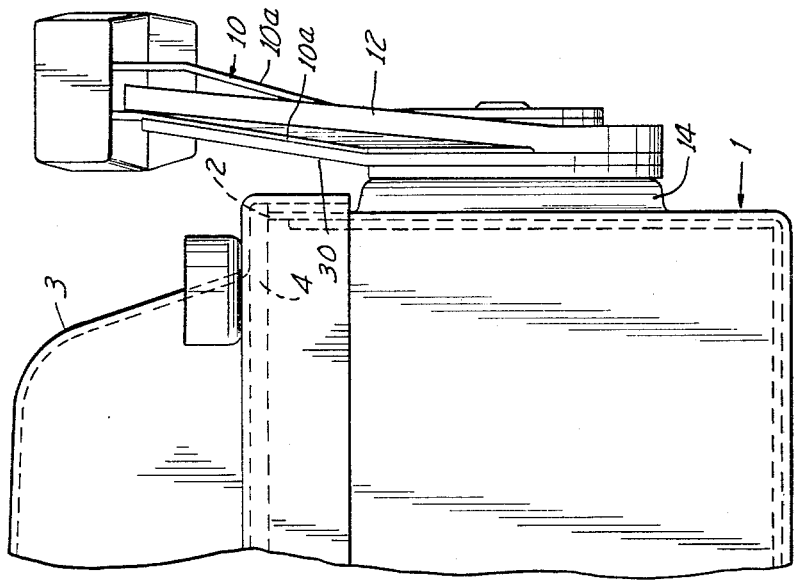
FIG. 3 is a fragmentary bottom plan view of a portion of the right hand side of the structure illustrated in FIG. 1.

Referring to the drawings, the switch enclosure comprises a sheet metal box 1 having side and rear walls, a forward open face with a peripheral edge 2, and a front door 3 which is hinged to one side wall of the box for swinging freely into and out of closed position. A resilient gasket 4 is mounted on the inner face of the door near the margin thereof so as to be drawn tightly into sealing relation to the edge 2 when the door is drawn tightly into closed position.

Mounted within the box is a switch having an operating bar 5 with arm portions 5a and 5b at its ends. The bar 5 carries a plurality of movable contacts 6 for cooperating with the plurality of stationary contacts 7 mounted on the rear wall of the box. The arm 5a is rockably mounted in a bracket 8 on one side of the box. The arm 5b is coaxial with the arm 5a and is rockably mounted at the other side of the box on an inner end pin portion 9 of a shaft 11, to be described.

In order to operate the switch, an external switch operating handle 10, comprising two laterally spaced and aligned arms 10a, is mounted on the outer end of a suitable rock shaft 11. The shaft 11 extends through a handle bearing 12, having an integral rotation limiting boss 12a, and through an aperture 13 in an external boss 14 on the side wall of the box adjacent the arm 5b. The boss 12a is of constant radius and is coaxial with the shaft 11, and extends partway circumferentially of the shaft and in radially outwardly spaced relation therefrom. The bearing 12 is secured in fixed position on the boss 14 by bolts or other means, not shown.

The shaft 11 has an out-of-round, preferably hexagonal, portion 11a extending the major portion of its length from its outer end.

The handle 10, as a unit, is connected to the shaft 11 for rocking therewith, preferably by suitable aligned out-of-round holes in the handle portions 10a of a shape to fit snugly the out-of-round portion 11a of the shaft 11.

A cam operator 15 is mounted on the part of the portion 11a which is within the box for rotation with the shaft. The cam operator is provided with a lug 16 which drivingly connects it, with a lost motion connection, to a cam 17.

The arm 5b of the bar 5 is engageable by suitable spaced lugs 19 on the cam for rocking the bar 5 in opposite directions about its axis in response to the rocking of the handle 10. It is desirable that the cam be operated with snap action, and for this purpose a dead center spring 20 is drivingly connected to the cam 17 so as to rock it with a snap action to the On and Off positions when it is moved by the operating handle 10 and operator 15 past dead center in the selected direction.

For drawing the door 3 tightly into sealed position after it is closed, the door is provided with an upper interlock finger 22 and a lower interlock finger 23. These fingers are arranged to cooperate, with a wedging action, with a suitable slide bar 24 mounted inside the box for sliding endwise along the side wall thereof. The slide bar 24 carries at its upper end a wedging finger 25 and at its lower end a wedging finger 26. The fingers 25 and 26 cooperate with a camming action with the fingers 22 and 23 of the door, respectively, upon movement of the slide bar 24 endwise in one direction, to wedge the door firmly in closed position. The bar 24 is driven endwise by means of an exterior operating sealing lever 30. The structure thus far described is fully disclosed in the above copending application and does not embody the improvement of the present invention.

The improvement constituting the present invention resides in the combination of the driving connections between the lever 30 and the bar 24, and between the handle 10 and the cam operator 15, together with sealing means which provide an effective seal of the wall aperture through which the driving means extend.

In the above application, a lever such as the lever 30 is drivingly connected to a slide bar in the box by means of a tang which extends through an arcuate slot in a boss on the box wall, which slot is coaxial with the rocking axis of the lever and operating handle and spaced radially outwardly from the axis. In the present invention the tang and slot connection is omitted. Instead, the lever 30 is provided near one end with an aperture 31 which is out-of-round and preferably hexagonal. The lever has arcuate slot 32 which is spaced outwardly from, and is coaxial with, the passage 31. The slot 32 is arranged to receive the boss 12a and limit the rocking movement of the lever 30 about the axis of the shaft 11. Mounted on the shaft 11 is a sleeve 34, as best illustrated in FIGS. 4 and 7. The sleeve 34 has a central passage 35 of uniform diameter and external peripheral groove 36 of which the bottom wall is cylindrical and coaxial with the passage 35. Near its ends the sleeve has outer and inner out-of-round or hexagonal portions 37 and 38, respectively. The shaft 11 is received in the passage 35 and supports the sleeve for rotation relative to the shaft about the shaft axis. A sealing O-ring 39 is disposed in a suitable circumferential groove in the shaft 11 in sealing relation to the bottom wall of the groove and in sealing engagement with the wall of the passage 35 of the sleeve 34.

The passage 31 of the lever 30 fits the outer hexagonal surface 37 of the sleeve 34, and is subsetantially coextensive therewith axially, so that rocking of the lever 30 correspondingly rocks the sleeve 34 relative to the shaft 11. A slide operator 40 comprises a disc of metal having a central passage 41 which fits the inner hexagonal portion 38 of the sleeve, so that the operator 40 rocks with the sleeve 34. The operator 40 has a radial finger 42 on the end of which is a bent-over lug 43. The lug 43 is arranged to engage a suitable slot 44 in the slide bar 24 for moving the slide bar endwise to latched sealing position and to unlatched releasing position, selectively, by rocking of the lever 30. This arrangement provides an effective seal between the shaft 11 and the sleeve.

It is desirable, however, that an effective seal also be provided between the exterior peripheral surface of the sleeve 34 and the peripheral edge of the aperture 13 of the boss 14. For this purpose, a resilient grommet 46, as best illustrated in FIGS. 4 and 9, is provided. The grommet is arranged to seat in the groove 36 of the sleeve 34 in sealing relation. The grommet 46 has an external peripheral groove 47 spaced from its ends, the side walls of the groove providing radial flange 48 and 49. The grommet is arranged so that the peripheral edge of the aperture 13 of the boss 14 seats on the bottom of the groove 47, and the radial margins of the boss 14 surrounding the aperture 13 are engaged by the inner faces of the flanges 48 and 49, respectively, so that an effective seal is provided between the grommet and the side wall of the boss 14. The inner periphery of the grommet, where it seats in the groove 36 of the sleeve, may be suitably lubricated to premit relative rotation of the grommet and sleeve.

It is apparent that with this arrangement the lever 30 can be rocked about the axis of the shaft 11, thereby rocking the sleeve 34 which, in turn, rocks the slider operator 40. During rocking, a seal is maintained between the shaft 11 and the sleeve 34 by the O-ring 39, and a seal is maintained between the outer periphery of the sleeve 34 and the inner peripheral edge and margin of the aperture 13 of the boss 14 by the grommet 46. Thus only one aperture is required in the present improvement, instead of an eccentric slot, and as a result, a more effective seal is provided.

Having thus described our invention, we claim:

1. A switch enclosure and switch operating mechanism comprising:

a box having a service opening;

a door for closing and sealing the opening when the door is drawn tightly into closed position;

switch operating mechanism in the box and including a switch bar;

an external operating handle for the operating mechanism;

door sealing mechanism in the box;

an external door sealing lever for the sealing mechanism;

one wall of the box having an aperture;

a rock shaft extending through the aperture; said handle being connected externally of the box to the shaft for rocking therewith;

the shaft at its inner end being drivingly connected to the switch operating mechanism;

wherein the improvement comprises rockable means extending through the aperture in surrounding relation to, and rockable relative to, the shaft;

means connecting the shaft at its outer end to the lever for rocking the shaft by the lever;

means connecting the inner end of the shaft to the door sealing mechanism;

sealing means between said rockable means and shaft; and sealing means between said rockable means and the marginal portion of the side wall surrounding the aperture.

2. The structure according to claim 1 wherein said rockable means comprises a sleeve mounted on the shaft in coaxial relation thereto and having an internal peripheral sealing surface;

said shaft has an external peripheral sealing surface aligned radially with the sealing surface of the sleeve;

the first mentioned sealing means is a resilient sealing gasket disposed between, and in sealing relation to, said surfaces;

said sleeve has an external peripheral sealing surface; and the second mentioned sealing means is a resilient gasket disposed between and in sealing relation to said external peripheral surface and said marginal portion of the side wall.

3. The structure according to claim 2 wherein the sleeve extends through the aperture and has out-of-round end portions at the outside and at the inside of said side wall, respectively, and has an external peripheral groove between said end portions;

said groove having a cylindrical bottom wall;

said lever has an out-of-round aperture complementary to, and fitting, the outer end portion of the sleeve, said sealing mechanism includes an operator within the box and having an out-of-round aperture complementary to, and fitting, the inner end portion of the sleeve; and the gasket of the second mentioned sealing means is a grommet which is seated in said groove and has an external peripheral trough in which said marginal portion surrounding the aperture fits in sealing relation.

4. The structure according to claim 1 wherein the switch operating mechanism includes a cam mounted on the inner end of the rock shaft for rocking relative thereto about the axis thereof;

a cam operator on the shaft between the cam and side wall and having an aperture complementary to, and fitting, the inner out-of-round portion of the rock shaft, and connected to the cam with a lost motion connection.

5. The structure according to claim 1 wherein one end of said switch bar is pivotally supported by the inner end portion of the rock shaft for rocking relative thereto.

6. The structure according to claim 1 wherein the door sealing mechanism includes a slide bar in the box, and a slide operator wholly within the box and connected to the bar and to the rockable means for rocking therewith.

References Cited

UNITED STATES PATENTS

| | | | |
|---|---|---|---|
| 2,759,054 | 8/1956 | Goudy et al. | 200—50 |
| 3,059,072 | 10/1962 | Mekelburg et al. | 200—50 |
| 3,213,213 | 10/1965 | De Smiot | 200—168 X |
| 3,229,056 | 1/1966 | Turnbull | 200—50 |

ROBERT K. SCHAEFER, *Primary Examiner.*

H. O. JONES, *Assistant Examiner.*